US007698349B2

(12) United States Patent
Hulen et al.

(10) Patent No.: US 7,698,349 B2
(45) Date of Patent: Apr. 13, 2010

(54) DIMENSION MEMBER SLIDING IN ONLINE ANALYTICAL PROCESSING

(75) Inventors: Corey James Hulen, Sammamish, WA (US); Carolyn K. Chau, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 331 days.

(21) Appl. No.: 11/138,732

(22) Filed: May 25, 2005

(65) Prior Publication Data

US 2006/0271583 A1   Nov. 30, 2006

(51) Int. Cl.
*G06F 12/00*  (2006.01)
(52) U.S. Cl. ...................................... 707/805
(58) Field of Classification Search ............... 707/200, 707/201, 103, 102, 2, 101
See application file for complete search history.

(56) References Cited

U.S. PATENT DOCUMENTS

| 4,714,992 | A | * | 12/1987 | Gladney et al. ............. 707/206 |
| 4,875,159 | A | * | 10/1989 | Cary et al. .................. 707/203 |
| 5,047,918 | A | * | 9/1991 | Schwartz et al. ............ 707/203 |
| 5,278,979 | A | * | 1/1994 | Foster et al. ................ 707/203 |
| 5,600,832 | A | * | 2/1997 | Eisenberg et al. ........... 707/203 |
| 5,806,078 | A | * | 9/1998 | Hug et al. ................... 715/511 |
| 6,026,413 | A | * | 2/2000 | Challenger et al. .......... 707/202 |
| 6,088,717 | A | * | 7/2000 | Reed et al. .................. 709/201 |
| 6,167,396 | A | * | 12/2000 | Lokken ........................ 707/3 |
| 6,314,434 | B1 | * | 11/2001 | Shigemi et al. ............. 707/203 |
| 6,606,621 | B2 | * | 8/2003 | Hopeman et al. .............. 707/3 |
| 6,631,386 | B1 | * | 10/2003 | Arun et al. .................. 707/203 |
| 6,707,454 | B1 | * | 3/2004 | Barg et al. .................. 345/440 |
| 6,970,874 | B2 | * | 11/2005 | Egilsson et al. ............. 707/100 |
| 6,988,104 | B2 | * | 1/2006 | Kootale ...................... 707/100 |
| 7,181,450 | B2 | * | 2/2007 | Malloy et al. .................. 707/4 |
| 7,356,779 | B2 | * | 4/2008 | Cras et al. .................. 715/853 |
| 7,363,287 | B2 | * | 4/2008 | Kilmer et al. .................. 707/2 |
| 7,386,571 | B2 | * | 6/2008 | Gupta ..................... 707/103 Y |
| 7,418,459 | B2 | * | 8/2008 | Gupta ........................ 707/102 |
| 7,426,059 | B2 | * | 9/2008 | Broda et al. ................. 358/1.3 |
| 2001/0047364 | A1 | * | 11/2001 | Proctor .................... 707/104.1 |
| 2002/0059195 | A1 | * | 5/2002 | Cras et al. ..................... 707/3 |
| 2005/0065910 | A1 | * | 3/2005 | Welton et al. ................. 707/2 |
| 2006/0053136 | A1 | * | 3/2006 | Ashiri ....................... 707/101 |

* cited by examiner

*Primary Examiner*—John R Cottingham
*Assistant Examiner*—Mohammed R Uddin
(74) *Attorney, Agent, or Firm*—Merchant & Gould, P.C.

(57) ABSTRACT

A dimension member of a report is slid to produce a new view of the report that corresponds to the slid dimension. The dimension member sliding allows navigation of a dimension of the data by members in a pattern that is not hierarchical. The view of the report corresponds to a hierarchy tree that is decomposed into a matrix. The next dimension members are determined using the matrix and the dimensionally slid view of the report is generated.

18 Claims, 12 Drawing Sheets

| 2001 | 2001 | 2001 | 2001 | 2001 | 2001 |
|------|------|------|------|------|------|
| Q4 | Q4 | Q4 | Q4 | Q4 | Q4 |
| Nov. | Nov. | Nov. | Dec. | Dec. | Dec. |
| Actual | Target | Status | Actual | Target | Status |

*Fig. 8*

| 2001 | 2001 | 2001 | 2001 | 2001 | 2001 | 2001 | 2001 | 2001 | | | |
|---|---|---|---|---|---|---|---|---|---|---|---|
| Q4 | Q4 | Q4 | Q4 | Q4 | Q4 | Q4 | Q4 | Q4 | | | |
| Nov. | Nov. | Nov. | Dec. | Dec. | Dec. | Dec. | Dec. | Dec. | | | |
| Actual | Target | Status | Actual | Target | Status | Actual | Target | Status | Actual | Target | Status |

*Fig. 9*

| 2001 | 2001 | 2001 | 2002 | 2002 | 2002 |
|------|------|------|------|------|------|
| Q4 | Q4 | Q4 | Q1 | Q1 | Q1 |
| Dec. | Dec. | Dec. | Jan. | Jan. | Jan. |
| Actual | Target | Status | Actual | Target | Status |

*Fig. 10*

| 2001 | | | | 2002 | | | |
|---|---|---|---|---|---|---|---|
| Q4 | | | | Q1 | | | |
| Dec. | | | | Jan. | | | |
| Actual | Target | Status | | Actual | Target | Status | |

*Fig. 11*

大专栏  DIMENSION MEMBER SLIDING IN ONLINE ANALYTICAL PROCESSING

DIMENSION MEMBER SLIDING IN ONLINE ANALYTICAL PROCESSING

BACKGROUND

Online analytical processing (OLAP) is an integral part of most data warehouse and business analysis systems. OLAP services provide for fast analysis of multidimensional information. For this purpose, OLAP services provide for multidimensional access and navigation of the data in an intuitive and natural way, providing a global view of data that can be "drilled down" into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

In OLAP, information is viewed conceptually as cubes, consisting of dimensions, levels, and measures. In this context, a dimension is a structural attribute of a cube that is a list of members of a similar type in the user's perception of the data. Typically, hierarchy levels are associated with each dimension. For example, a time dimension may have hierarchical levels consisting of days, weeks, months, and years, while a geography dimension may have levels of cities, states/provinces, and countries. Dimension members act as indices for identifying a particular cell or range of cells within a multidimensional array. Each cell contains a value, also referred to as a measure, or measurement.

One issue regarding the design of multidimensional databases is how to navigate in the multidimensional space. Since a multidimensional database is organized hierarchically, navigation in the multidimensional space has been limited to hierarchical navigation. However, a user may desire to navigate a dimension by members in a pattern that is not hierarchical. For example, a user may desire to move across parallel periods in a time dimension (e.g., from September Q3 2003 to September Q3 2004). This type of navigation has not been simple, requiring a user to navigate the hierarchy through a series of button clicks to reach the desired time period.

SUMMARY

Embodiments of the present invention relate to dimension member sliding in an online analytical processing (OLAP) cube or other multidimensional database. The dimension member sliding allows a user to navigate a dimension of the data by members in a pattern that is not hierarchical. For example, a user is allowed to navigate across parallel periods in the time dimension (e.g., September Q3 2003 to September Q3 2004) on a scorecard in a single button click rather than having to navigate the hierarchy. Scorecards provide an exemplary view of data for evaluating organizational performance and other metrics. However, the functionality provided by the present invention is equally applicable to other types of reports. Generally, scorecards are updated by navigating dimensions hierarchically. The present invention allows for the same simplicity of navigation across dimensions when navigating according to a pattern that is not hierarchical.

In accordance with one aspect of the present invention, a method for dimension member sliding includes determining an original set of data that is included in a scorecard and updating the data. The data is updated in response to a selection on a bar slider included in the view of the scorecard. The updated data corresponds to data in the multidimensional structure that is non-hierarchically dimensionally relative to the original set of data.

In accordance with another aspect of the present invention, dimensionally sliding a scorecard includes determining a currently selected hierarchy. The currently selected hierarchy corresponds to a current view of the scorecard. The currently selected hierarchy is decomposed into a matrix. A next set of leaf node members is determined that are dependent on the dimension of the scorecard being slid. The matrix is populated with the next set of leaf node members and is rebuilt. Similar cells of the matrix are merged to produce a new hierarchy. The new hierarchy corresponds to a slid version of the scorecard.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 8 illustrates an example of a matrix that corresponds to the scorecard view of FIG. 4 in accordance with the present invention.

FIG. 9 illustrates an example of a transitional state of the matrix corresponding to sliding the scorecard view of FIG. 4 to the scorecard view of FIG. 5 in accordance with the present invention.

FIG. 10 illustrates another example of a transitional state of the matrix corresponding to sliding the scorecard view of FIG. 4 to the scorecard view of FIG. 5 in accordance with the present invention.

FIG. 11 illustrates an example of a matrix that corresponds to the scorecard view of FIG. 5 in accordance with the present invention.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
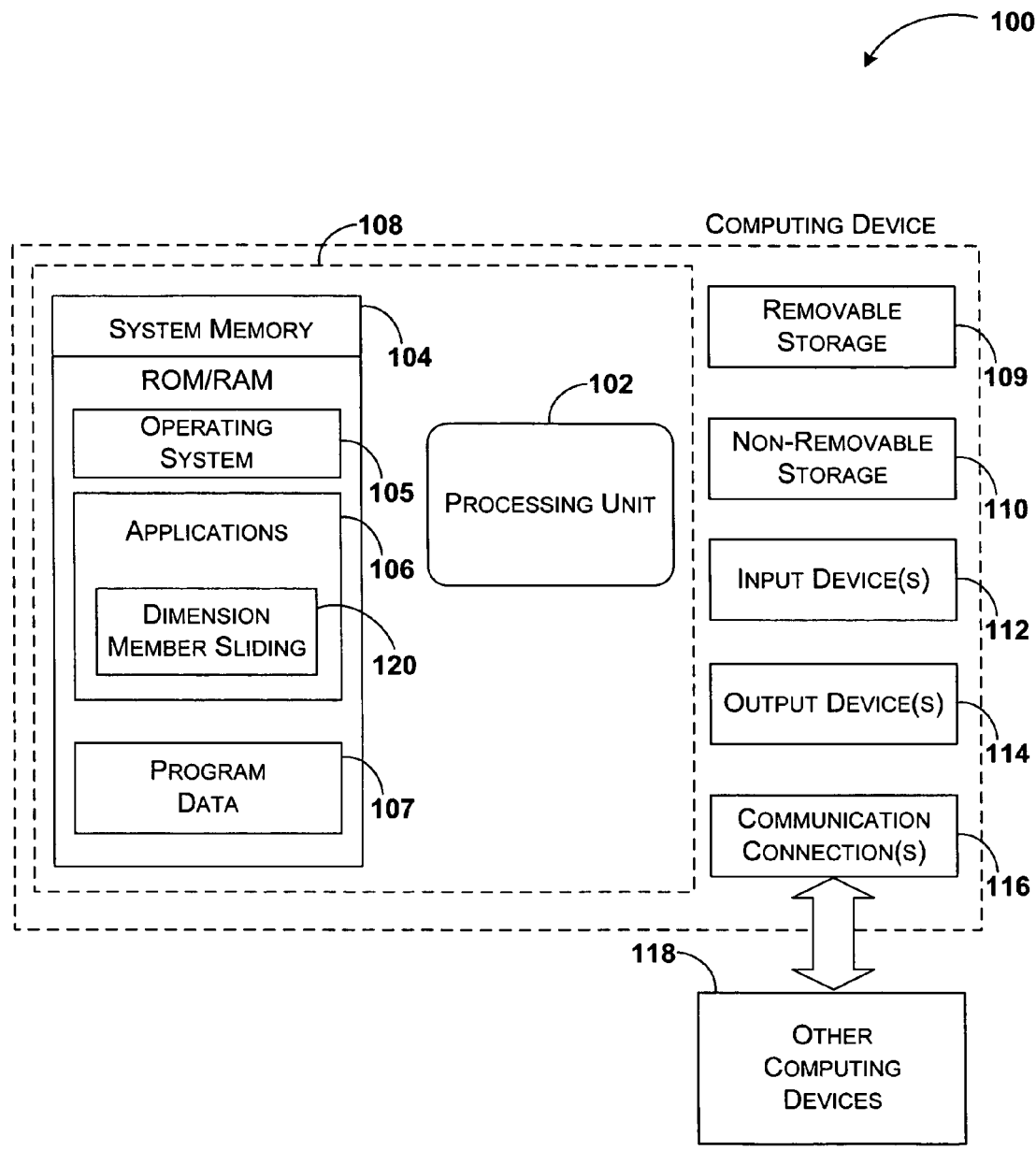
FIG. 1 illustrates an exemplary computing device that may be used in one exemplary embodiment of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one embodiment, applications 106 further include an application 120 for implementing dimension member sliding functionality and/or a multidimensional database in accordance with the present invention. The functionality represented by application 120 may be further supported by additional input devices, 112, output devices 114, and communication connection(s) 116 that are included in computing device 100 for configuring and deploying a scorecard presentation application.

Figure 2:
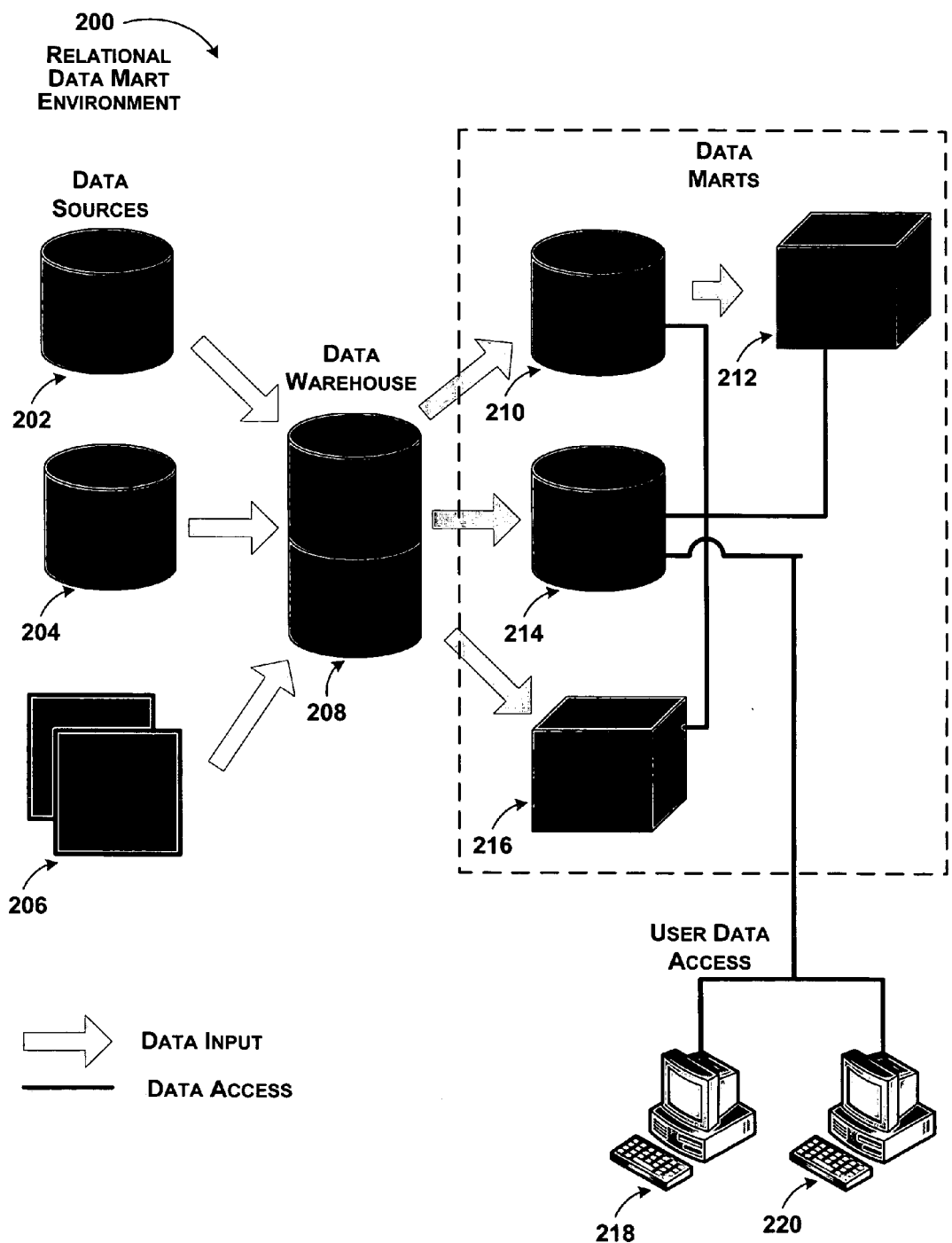
FIG. 2 illustrates an exemplary environment in which one exemplary embodiment of the present invention may be employed.

FIG. 2 illustrates an exemplary environment in which one exemplary embodiment of the present invention may be employed. With reference to FIG. 2, one exemplary system for implementing the invention includes a relational data sharing environment, such as data mart environment 200. Data mart environment 200 may include implementation of a number of information systems such as performance measures, business scorecards, and exception reporting. A number of organization-specific applications including, but not limited to, financial reporting/analysis, booking, marketing analysis, customer service, and manufacturing planning applications may also be configured, deployed, and shared in environment 200.

A number of data sources such as SQL server 202, database 204, multi-dimensional data sources such as text files or EXCEL® sheets 206 may provide input to data warehouse 208. Data warehouse 208 is arranged to sort, distribute, store, and transform data. In one embodiment, data warehouse 208 may be an SQL server.

Data from data warehouse 208 may be distributed to a number of application-specific data marts. These include direct SQL server application 214, analysis application 216 and a combination of SQL server (210)/analysis application (212). Analyzed data may then be provided in any format known to those skilled in the art to users 218, 220 over a network. In another embodiment, users may directly access the data from SQL server 214 and perform analysis on their own machines. Users 218 and 220 may be remote client devices, client applications such as web components, EXCEL® applications, business-specific analysis applications, and the like.

The present invention is not limited to the above described environment, however. Many other configurations of data sources, data distribution and analysis systems may be employed to implement a summary scoring system for metrics from a multi-dimensional source without departing from the scope and spirit of the invention.

Figure 3:
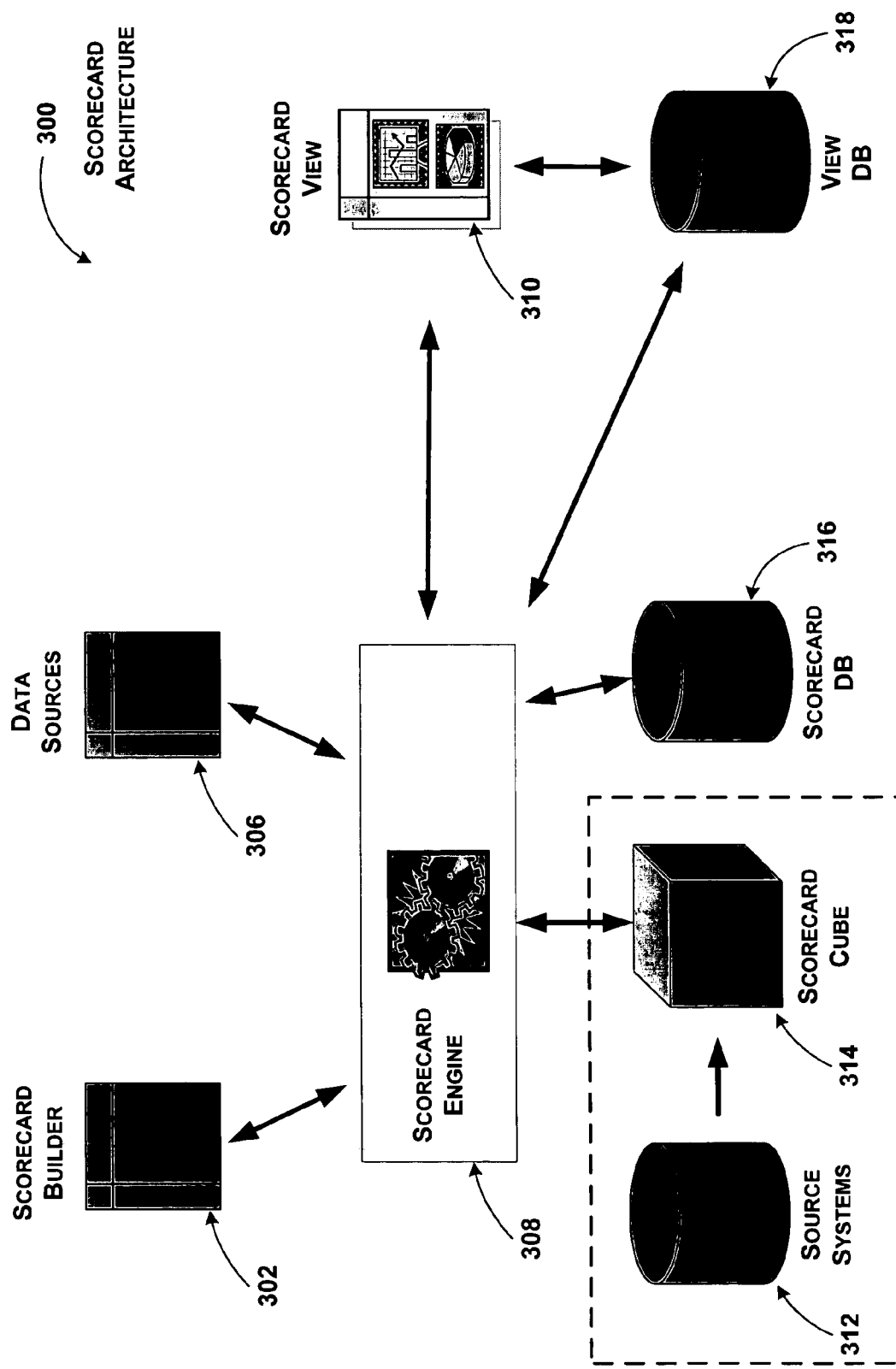
FIG. 3 illustrates an exemplary scorecard architecture according to one exemplary embodiment of the present invention.

FIG. 3 illustrates an exemplary scorecard architecture according to one exemplary embodiment of the present invention. Scorecard architecture 300 may comprise any topology of processing systems, storage systems, source systems, and configuration systems. Also, scorecard architecture 300 may have a static or dynamic topology without departing from the spirit and scope of the present invention.

Scorecards provide an exemplary view of data for evaluating organizational performance and other metrics. The performance measures may vary from financial data (e.g., sales growth) to service information (e.g., customer complaints). In a non-business environment, student performances and teacher assessments may be another example of performance measures that can employ scorecards for evaluating organizational performance. In the exemplary scorecard architecture (300), a core of the system is scorecard engine 308. Scorecard engine 308 may be an application that is arranged to evaluate performance metrics. Scorecard engine 308 may be loaded into a server, executed over a distributed network, executed in a client device, and the like. While the discussion herein is directed to scorecards, it is appreciated that the functionality provided by the present invention is equally applicable to other types of reports and is not limited to use with scorecards.

Data for evaluating various measures may be provided by a data source. The data source may include source systems 312, which provide data to a scorecard cube 314. Source systems 312 may include multi-dimensional databases such as OLAP, other databases, individual files, and the like, that provide raw data for generation of scorecards. Scorecard cube 314 is a multi-dimensional database for storing data to be used in determining Key Performance Indicators (KPIs) as well as generated scorecards themselves. As discussed above, the multi-dimensional nature of scorecard cube 314 enables storage, use, and presentation of data over multiple dimensions such as compound performance indicators for different geographic areas, organizational groups, or even for different time intervals. It is along these dimensions that the present invention is able to slide the view of the scorecard. Scorecard cube 314 has a bi-directional interaction with scorecard engine 308 providing and receiving raw data as well as generated scorecards.

Scorecard view 310 corresponds to an application to deploy scorecards, customize views, coordinate distribution of scorecard data, and process web-specific applications associated with the performance evaluation process. For example, scorecard view 310 may include a web-based printing system, an email distribution system, and the like. In another embodiment, scorecard view 310 may correspond to a network page view of the scorecard.

The definition for the layout of the scorecard within the view is stored in view database 318. View database 318 stores the metadata for the layout and structure of cells within the view. In an alternative embodiment, the layout definition is not stored in a separate view database as shown, but rather in a database associated with scorecard engine 308 (e.g., scorecard database 316). The metadata for a particular view includes the dimensionalities that are to be shown in the view (e.g., the time dimension, a geography dimension, etc.) and the level of those dimensions. For example, turning briefly to FIG. 4, the dimensionalities selected for the sales scorecard shown are the time dimension broken down into years quarters and months along with a data type dimension that classifies the data as actual values, expected values, and a status. In the sales scorecard, the view is selected such that only two months are shown. This type of information is stored in view database 318. Also stored in the view metadata is an indicator of whether a dimension shown is "slidable". A slidable dimension is a dimension where the functionality of the present invention may be applied. For example, in FIG. 4, the time dimension is show as slidable (see slide bar 450) while the data type dimension 410 is not slidable. Navigating a slidable dimension, or dimension member sliding, refers to interpreting the next logical sequential member of a dimension based on the direction of the slide chosen.

Scorecard database 316 is arranged to operate in a similar manner to scorecard cube 314 but instead of the actual data of the scorecard, scorecard database 316 provides a definition for the data stored inside the scorecard. Basically, the scorecard database 316 store the metadata that provides the interrelation between the raw data stored in the scorecard cube 314 for output in scorecard view 310.

Scorecard builder 302 may be a separate application, a part of the performance evaluation application, and the like. Scorecard builder 302 is employed to configure various parameters of scorecard engine 308 such as scorecard elements, default values for actuals, targets, and the like. Scorecard builder 302 may include a user interface such as a web service, a GUI, and the like.

Data Sources 306 may be another source for providing raw data to scorecard engine 308. Data sources 306 may also define KPI mappings and other associated data.

A scorecard created using scorecard architecture 300 may have multiple views based on the dimensions illustrated in the view. For example, a first view of the scorecard may organize data according to different time periods while another view of the same scorecard may organize the data according to different geographical locations. Despite the type of view shown, the view may be slid according to the dimension members to change the view in accordance with the present invention.

Illustrative Embodiments for Dimension Member Sliding

Figure 4:
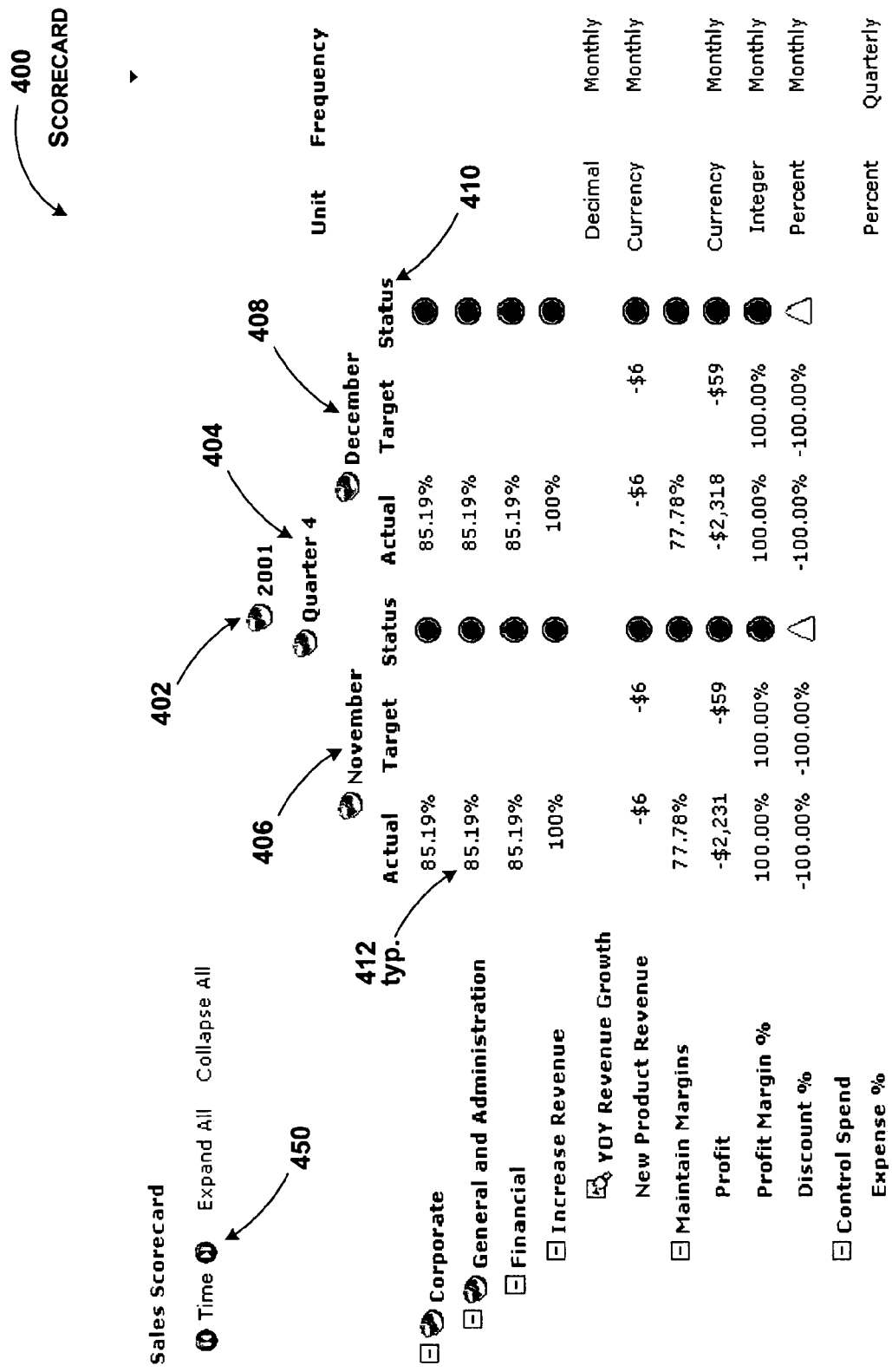
FIG. 4 illustrates an exemplary scorecard generated according to one exemplary embodiment of the present invention.
Figure 5:
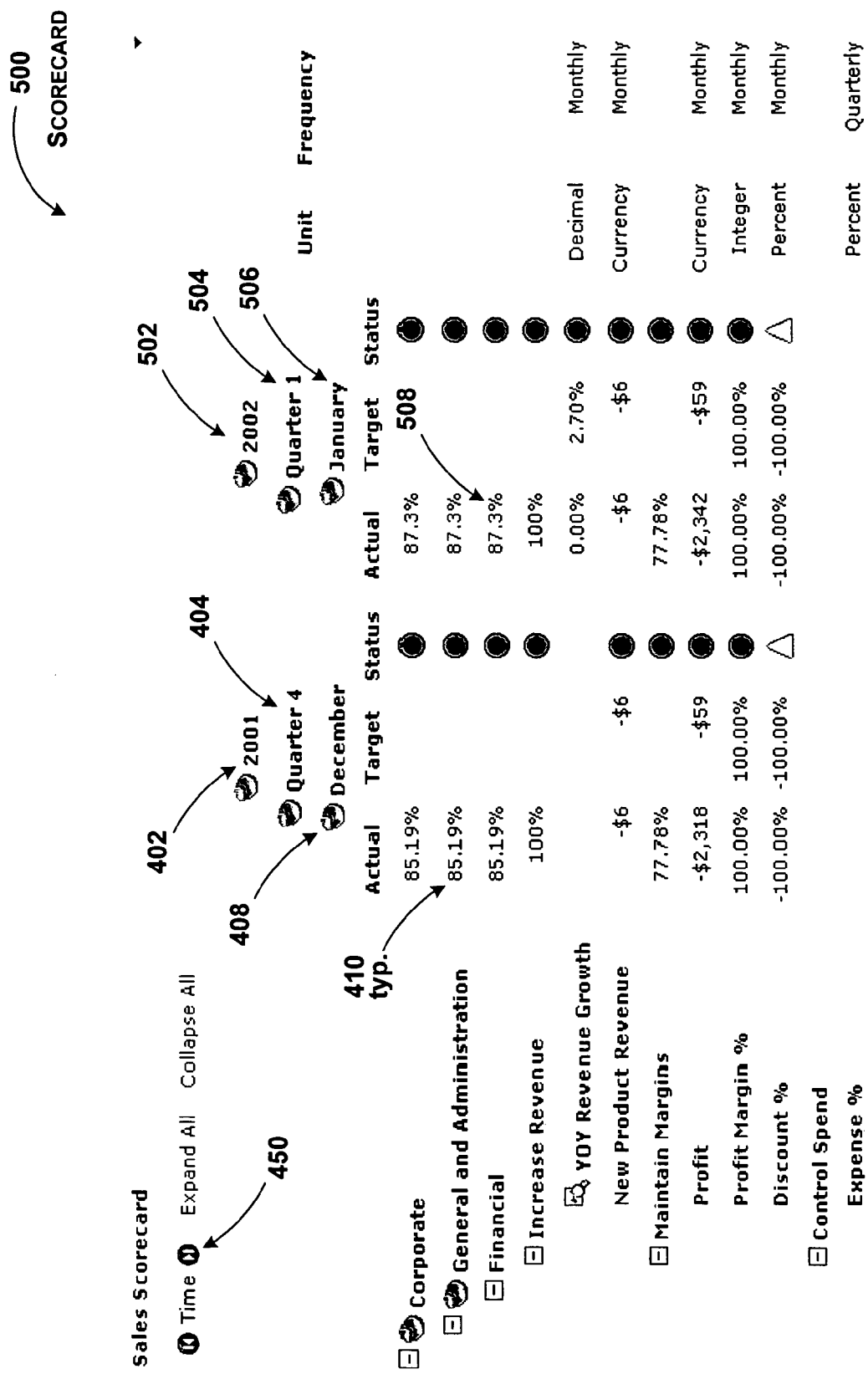
FIG. 5 illustrates another exemplary scorecard generated according to one exemplary embodiment of the present invention that corresponds to the scorecard of FIG. 4 with a slid dimension member.

FIGS. 4 and 5 illustrate screen shots of two exemplary scorecards generated according to one exemplary embodiment of the present invention.

When defining a scorecard, there are a series of elements that may be used. The type of scorecard may determine which elements are included in the scorecard and the relationships between the included elements such as Perspectives, Objectives, KPIs, KPI groups, Themes and Initiatives. Each of these elements has a specific definition and role as prescribed by the scorecard methodology.

Often the actual elements themselves, i.e. a Financial Perspective or a Profit Margin % KPI—might be elements that apply to more than one scorecard. By defining each of these items in a scorecard elements module, a "shared" instance of that object is created. Each scorecard may simply reference the element and need not duplicate the effort in re-defining the item.

Some of the elements may be specific to one type of scorecard. Others such as KPI groups may be specific to other scorecards. Yet some elements may be used in all types of scorecards. However, the invention is not limited to these elements. Other elements may be added without departing from the scope and spirit of the invention.

In FIG. 4, scorecard 400 is a sales scorecard that includes sales data (e.g., 410) organized according to the time dimension. The time dimension is structured according to years 402, quarters 404, and months 406 and 408. In addition, the data is further organized according to a second dimension of data type 410 that classifies the data according to actual values, target values, and status.

In the current view of scorecard 400, the interval of time shown for the sales data corresponds to the November and December months (406 and 408) of the fourth quarter (404) in the year 2001. The dimension member sliding of the present invention allows a user to "slide" or change the view of the scorecard to the next or previous instance of the dimension. In the example of the time dimension, sliding the scorecard changes the view of the scorecard to include the interval of time immediately previous or immediately subsequent to the current time interval is shown as the scorecard view. The change may be made by at click of a button by selecting slider bar 450. Using slider bar 450, a user is able to select a previous or later interval of time to be displayed in the view of scorecard 400. In another embodiment, a different slider bar is associated with each level of the dimension hierarchy. For example, a slider bar may be associated with the year, while other slider bars are associated with the quarter and the months. A user is then able to select to slide the dimension on a year by year basis, quarterly basis, or monthly basis.

FIG. 5 illustrates scorecard 500 as an example of when a user has selected to move forward an interval of time (i.e., slide forward) from the view of the scorecard shown in FIG. 4. In the example shown, the selection of bar slider 450 resulted in the view of the scorecard changing to include the next month, January (506), associated with the previous view (400) of the scorecard. Beyond sliding the dimension to the next month, the present invention is able to take into account that the year and the quarter has also changed to 2002 (502) and the first quarter (504) respectively. Additionally, the new view (500) of the scorecard reflects updated sales data (508) for the new time interval shown. In the embodiment shown, November dropped out and is not included in the new view (500) when the view was slid to the new time interval. The addition of the data for January and hiding the data for November when sliding the time dimension to the next dimension member (i.e., the next interval of time) provides layout consistency between the views of the sales scorecard. An exemplary process for sliding a dimension member to change the view of a scorecard is described in greater detail with regard to FIG. 6.

Figure 6:
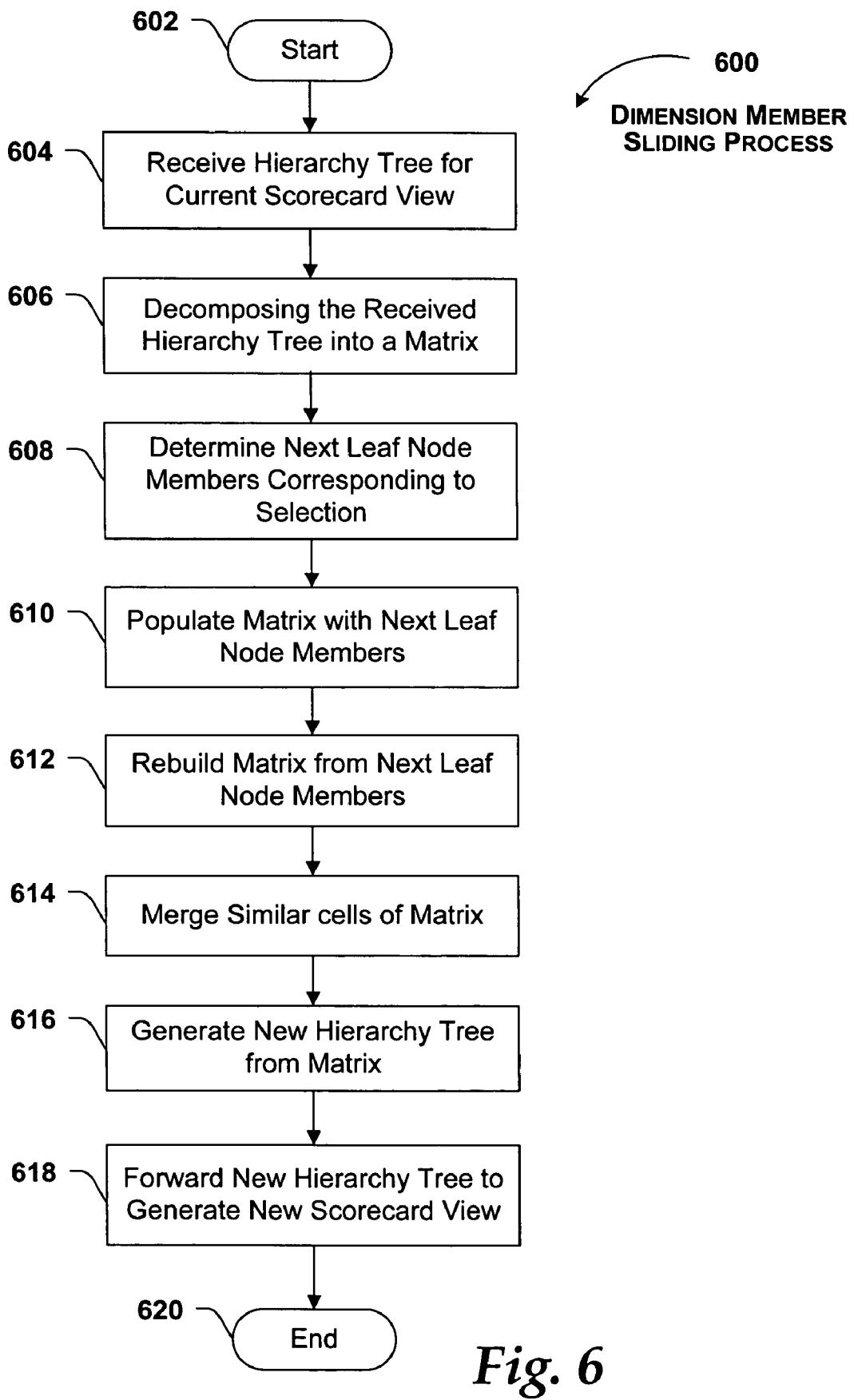
FIG. 6 illustrates an exemplary logical flow diagram for a process of dimension member sliding in accordance with the present invention.

FIG. 6 illustrates an exemplary logical flow diagram for a process of dimension member sliding in accordance with the present invention. Process 600 starts at block 602 where a user has selected a slider bar in the current view of a scorecard to change the view of the scorecard by sliding along a selected dimension of the scorecard. Processing continues at block 604.

Figure 7:
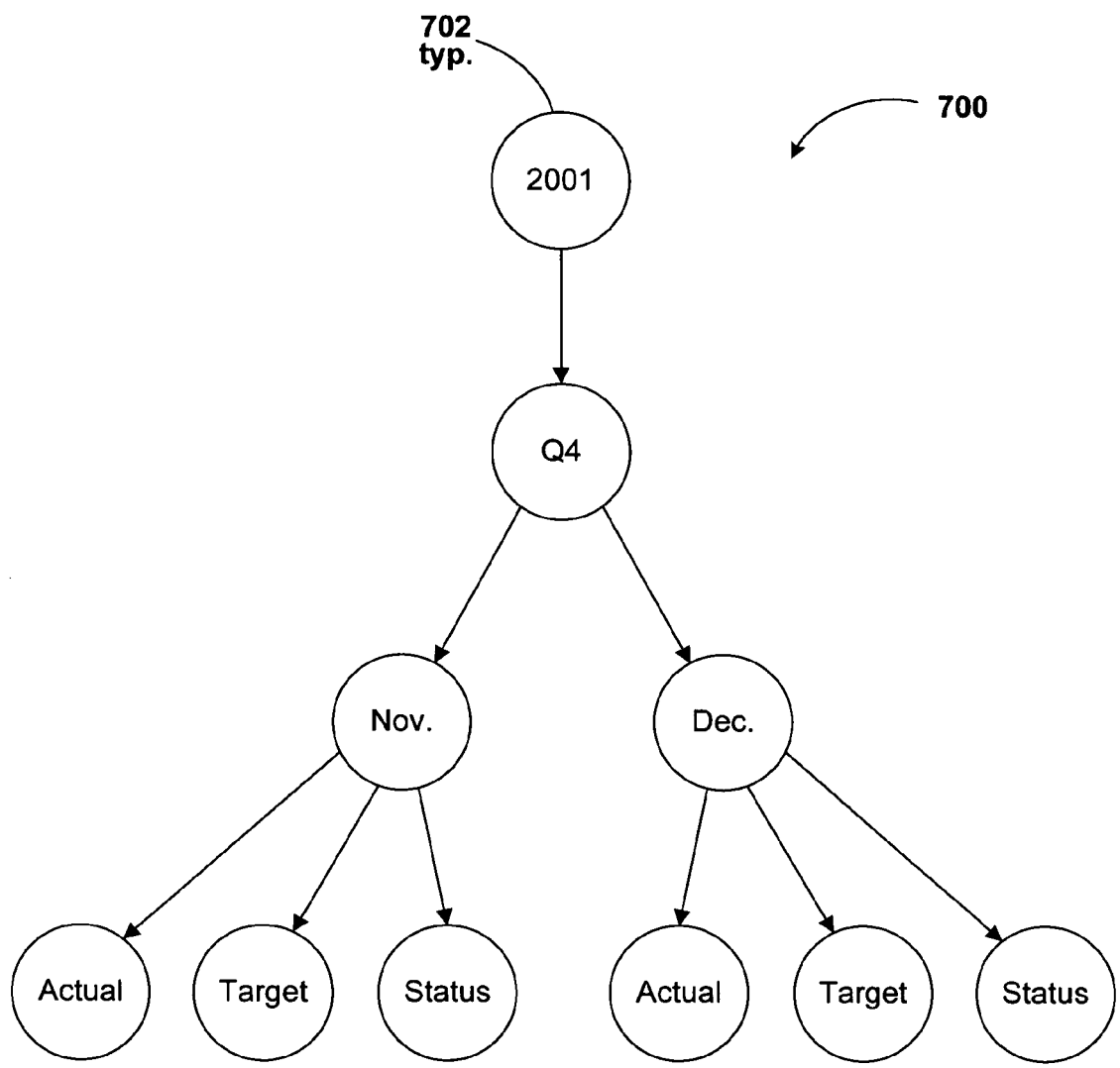
FIG. 7 illustrates an example of a hierarchy tree that corresponds to the scorecard view of FIG. 4 in accordance with the present invention.

At block 604, the scorecard engine (e.g., 308 of FIG. 3) receives the hierarchy tree that corresponds to the current view of the scorecard. In other embodiments, the current view of the scorecard is transmitted to the scorecard manager in another format such as a table or other data that represents the hierarchy tree. Turning to FIG. 7, an exemplary hierarchy tree is shown corresponding to scorecard view shown in FIG. 4. The hierarchy tree illustrates a number of nodes (e.g., 702) that correspond to the dimension members of the scorecard. For example, the nodes are organized in hierarchy 700 according to years as the root node, followed by quarters, months, and then the dimension for data type. After the hierarchy tree is received, processing continues at block 606.

At block 606, the received hierarchy tree is decomposed into a matrix that includes a row for each level of the hierarchy tree and a column for each leaf node of the tree. Turning briefly to FIG. 8, matrix 800 illustrates a matrix representation of the hierarchy tree 700 shown in FIG. 7. Each cell (e.g., 802) of the top row of matrix 700 corresponds to the top node of hierarchy tree 700, while the cells (e.g., 804) at the bottom row of the matrix correspond to the leaf nodes of the hierarchy tree. Processing continues at block 608.

At block 608, the next leaf node members are determined. In one embodiment, the present invention walks the hierarchy tree up and back down the nodes of the tree to determine the next leaf nodes in the tree. The hierarchy tree is walked corresponding to the direction on the dimension that the users selected to slide. In the example of hierarchy tree 700 of FIG. 7, the next logically sequential leaf node is not contained in hierarchy tree 700. To determine the next leaf node the scorecard engine (308) accesses the scorecard database (316 of FIG. 3) to determine the next leaf node members applicable. The scorecard database checks the definition of the scorecard to determine the next leaf node members. In an alternative embodiment, the present invention hides leaf node members that have no associated data. For example, if the next month did not have any sales figures, that month may be skipped when determining the next leaf nodes of the hierarchy. Accordingly, instead of sliding the view to include January as shown in FIG. 5, the view may be slid to show February if January had no sales figures. In the case of hierarchy tree 700, the next leaf node members are in a branch of the dimension hierarchy that corresponds to the month of January in the first quarter of the next year (2002). It may be that the dimension is slid in a direction opposite to the direction shown (i.e., backwards in time rather than forward). The "next set of leaf node members" refers to the leaf node members next in the direction selected for the dimension being slid, and not just the leaf node members forward in time. Sliding backwards in time, the next leaf node members are the next members reached moving in that direction in time. For example, moving from February backwards, the next leaf node member corresponds to January. The same is true for dimensions other than time, the next leaf node member is determined according to the direction of the bar slider selected. Once the next leaf node members are determined, processing continues at block 610.

At block 610, the next leaf node members are populated into the matrix. Turning briefly to FIG. 9, matrix 900 is expanded to include the next leaf node members corresponding to the next interval of time. In the embodiment shown, the next leaf node members correspond to the previous leaf node members (e.g., the next leaf node members are "actual", "target", and "status"). In other embodiments, the leaf node members may be different. Since the present invention walks the hierarchy each time to determine the next leaf node members, the present invention is still able to slide along dimension members that do not have symmetrical members. For example, the leaf node members may correspond to products (e.g., A, B, C) that were sold in that particular quarter. The next quarter may have no products sold, or may have different products sold. Despite the changes, the present invention is still able to populate the matrix with the correct leaf node members whether or not they differ from the previous leaf nodes, or are located at different level of the hierarchy. The next leaf node members are placed into the cells (e.g., 904) at the bottom row of the matrix. After the matrix is populated with the next leaf node members, processing continues at block 612.

At block 612, the matrix is rebuilt up the hierarchy from the populated leaf node members. Turning again to FIG. 9, the upper rows of cells (e.g., 902) are populated by climbing the hierarchy from the leaf nodes populated in the matrix (e.g., 904). Again, the scorecard manager is able to examine the dimension hierarchy and determine the nodes higher than the next leaf node members. These higher nodes are then inserted into the matrix for each leaf node member. After the matrix is rebuilt, the matrix slides out any unnecessary cells (e.g., the cells for November of 2001 shown in FIGS. 8 and 9) and new matrix results. Turning briefly to FIG. 10, matrix 1000 shows a resulting new matrix that corresponds to a slid version of the matrix shown in FIG. 8. Once the new matrix is obtained from rebuilding the previous matrix, processing continues at block 614.

At block 614, adjacent, similar cells of the rebuilt matrix are merged to produce the hierarchy for the new view of the scorecard. Turning briefly to FIG. 11, matrix 1100 corresponds to matrix 1000 shown in FIG. 10 with merged cells (e.g., 1102). Since the first three cells of the top row each corresponding to "2001", these cells were merged into a single cell. The same occurred for other similar cells. From the merger of cells in the rebuilt matrix, the new hierarchy for the slid view of the scorecard is obtained. Once the cells are merged, processing continues at block 616.

Figure 12:
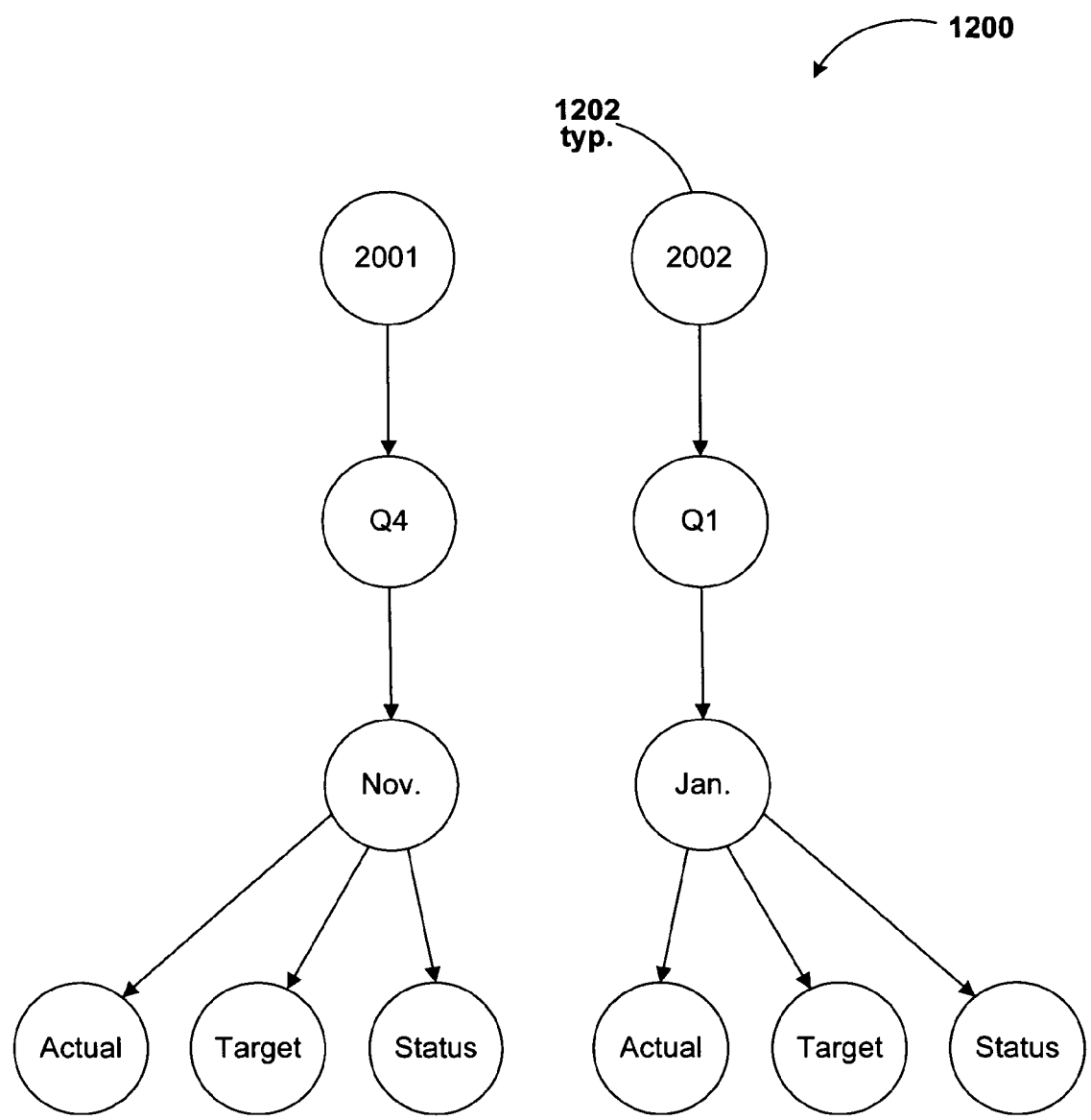
FIG. 12 illustrates an example of a hierarchy tree that corresponds to the scorecard view of FIG. 5 in accordance with the present invention.

At block 616, the new hierarchy tree for the slid view of the scorecard is forwarded from the scorecard engine (e.g., 308 of FIG. 3) to the scorecard view (310) for presentation to the user. Turning briefly to FIG. 12, hierarchy tree 1200 corresponds to the rebuilt matrix, and results in the slid view of the scorecard shown in FIG. 5. Accordingly, the scorecard architecture shown in FIG. 3 is able to take the current view of a scorecard (e.g., 400 of FIG. 4) and slide the dimension of the scorecard to produce a new view (e.g., 500 of FIG. 5) that is the same scorecard with the dimension moved sequentially. In the example used herein, the time dimension is moved so that the scorecard, previously showing the November and December months of the fourth quarter in 2001, is slid to show the December month of the fourth quarter in 2001 along with January of the first quarter in 2002. To a user, it appears almost as if the dimension continues off screen, and by pressing the bar slider selection, the next sequential member of the dimension is slid into view. With the new view of the scorecard generated, the scorecard cube or OLAP cube (e.g., 314 of FIG. 3) may be accessed to provide the data for the slid view. The data obtained from the cube is dimensionally relative to the original set of data in that it corresponds to the sequentially previous or next set of data for the dimension member that was slid. This data may be considered non-hierarchically dimensionally relative in that the data sets are not hierarchically related to one another (i.e., the data sets are not associated with dimension members of the same branch of a hierarchy where one set may be considered associated with a parent or child corresponding to the other data set). Once the hierarchy tree is forwarded for presentation of the new view to the user, processing continues to block 618 where processing ends and moves on to other scorecard processing.

As stated in the discussion above with regard to FIG. 6, FIGS. 7-12 are examples of hierarchy trees and stages of the matrix that correspond to sliding the time dimension on the scorecard view of FIG. 4 to produce the scorecard view of FIG. 5.

FIG. 7 illustrates an example of a hierarchy tree that corresponds to the scorecard view of FIG. 4 in accordance with the present invention. Each node (e.g., 702) in the hierarchy corresponds to a member of the dimensions in the scorecard. In the example shown, the hierarchy tree starts with the time dimension nodes. The topmost node for this particular view is labeled "2001", corresponding to dimension member 402 shown in FIG. 4. The next node down hierarchy tree 700 is labeled "Q4", corresponding to dimension member 404 and so on with each node at each level of the hierarchy tree corresponding to the dimensions members of the scorecard. The last nodes in the tree are referred to as the leaf nodes and correspond to the data type dimension members of "Actual", "Target", and "Status".

FIG. 8 illustrates an example of a matrix that corresponds to the scorecard view of FIG. 4 in accordance with the present invention. Matrix 800 is generated by decomposing the hierarchy tree of FIG. 7. Matrix 800 is generated by creating a column in the matrix for each leaf node of hierarchy tree 700. A row is generated in the matrix for each dimension level of hierarchy tree 700. The resulting matrix has a number of cells with repeating content, but allows for accurate determination of the next leaf nodes of the hierarchy.

FIG. 9 illustrates an example of a transitional state of the matrix corresponding to sliding the scorecard view of FIG. 4 to the scorecard view of FIG. 5 in accordance with the present invention. The next leaf nodes of the matrix have been determined according to the hierarchy and populated into the matrix. Matrix 900 therefore includes the previous matrix (as shown in FIG. 8) along with the new populated cells corresponding to the next leaf node members. The cells in the rows above the cells populated with the next leaf node members are empty and indicate that the matrix is rebuilt up from those cells to produce a new matrix for the slid view of the scorecard.

FIG. 10 illustrates another example of a transitional state of the matrix corresponding to sliding the scorecard view of FIG. 4 to the scorecard view of FIG. 5 in accordance with the present invention. Matrix 1000 is the matrix with the cells rebuilt from the next leaf node members and the portion of the matrix removed for the time interval opposite of the direction of the slide. The portion removed may be said to have "slid off" the scorecard as result of the user selection to slide the view. Matrix 1000 is the counterpart to matrix 800 and corresponds to the hierarchy tree for the slid view of the scorecard (e.g., scorecard 500 of FIG. 5).

FIG. 11 illustrates an example of a matrix that corresponds to the scorecard view of FIG. 5 in accordance with the present invention. Matrix 1100 corresponds to matrix 1000 shown in FIG. 10 with merged cells (e.g., 1102). Since the first three cells of the top row each corresponding to "2001", these cells were merged into a single cell. The same occurred for other similar cells. From the merger of cells in the rebuilt matrix, the new hierarchy for the slid view of the scorecard is obtained.

FIG. 12 illustrates an example of a hierarchy tree that corresponds to the scorecard view of FIG. 5 in accordance with the present invention. Hierarchy tree 1200 corresponds to the rebuilt matrix with merged cells shown in FIG. 11, and results in the slid view of the scorecard shown in FIG. 5. In the example used herein, the time dimension is moved so that the scorecard, previously showing the November and December months of the fourth quarter in 2001, is slid to show the December month of the fourth quarter in 2001 along with January of the first quarter in 2002. To a user, it appears almost as if the dimension continues off screen, and by pressing the bar slider selection, the next sequential member of the dimension is slid into view. It is from hierarchy tree 1200 that the present invention is able to provide the user with the slid view of the scorecard as shown in FIG. 5.

The above specification, examples and data provide a complete description of the manufacture and use of the composition of the invention. Although the subject matter has been described in language specific to the structure features and/or methodological acts, it is to be understood that the subject matter defined in the appended claims is not necessarily limited to the specific features and acts described above. Rather, the specific features and acts described above are disclosed as example forms of implementing the claims. Since many embodiments of the invention may be made without departing from the spirit and scope of the invention, the invention resides in the claims hereinafter appended.

What is claimed is:

1. A computer-implemented method for updating a view of a report that is based on an underlying multidimensional data structure, the method comprising:

determining an original set of data associated with a dimension that is included within the view of the report, wherein the next instance is an instance of the dimension that is immediately before the dimension or immediately after the dimension; wherein the original set of data includes an original instance of the dimension that includes an original set of leaf node members of an original parent node, wherein each leaf node member has no child node; and in response to a selection indicating to scroll the dimension to display a next instance of the dimension within the view of the report:

determining the next instance of the dimension, wherein the next instance includes a next set of leaf node members of a next parent node, the next parent node being different from the original parent node;

updating the data included in the view of the report for the dimension to correspond to the selection, wherein the updated data corresponds to data in the multidimensional structure that is non-hierarchically dimensionally relative to the original set of data and the updated data includes the next instance of the dimension, wherein the updating of the data includes:

decomposing the updated data into a matrix;

computing the next set of leaf node members included in the matrix;

rebuilding the matrix according to the next set of leaf node members;

merging similar cells of the matrix; and generating a new hierarchy from the matrix; and reading the new hierarchy and displaying the updated data such that the next instance of the dimension that includes the next set of leaf node members of the next parent node is displayed in response to the selection indicating to scroll the dimension.

2. The computer-implemented method of claim 1, wherein the original set of data and the updated set of data are dimensionally relative to one another according to the direction of a bar slider selected and the dimension member to which the bar slider is applied.

3. The computer-implemented method of claim 1, further comprising hiding rows and columns that contain no data applicable to the selection.

4. The computer-implemented method of claim 1, further comprising adding at least one of rows and columns in the report in response to the selection.

5. The computer-implemented method of claim 1, further comprising removing at least one of rows and columns in the report in response to the selection.

6. The computer-implemented method of claim 1, wherein the next set of leaf node members corresponds to the next sequential leaf node of the dimension being slid.

7. The computer-implemented method of claim 1, wherein the next set of leaf node members corresponds to the next sequential leaf node of the dimension being slid that has data associated with the leaf node.

8. The computer-implemented method of claim 1, wherein the similar cells that are merged are adjacent cells.

9. The computer-implemented method of claim 1, wherein the underlying multidimensional data structure is an Online Analytical Processing (OLAP) cube.

10. A computer-readable storage medium having computer-executable instructions thereon for dimensionally sliding a report according to an underlying multidimensional data structure, the instructions comprising:

determining a currently selected hierarchy associated with a dimension of the report being slid, wherein the currently selected hierarchy corresponds to a current view of the report and includes an original instance of the dimension that is a leaf node of an original parent node;

decomposing the currently selected hierarchy into a matrix;

in response to a selection indicating to scroll the dimension to display a next set of leaf node members of the dimension within cells of the report, computing the next set of leaf node members, wherein the next set of leaf node members is dependent on the dimension of the report being slid and are children of a next parent, the next parent being different from the original parent node;

populating the matrix with the next set of leaf node members;

rebuilding the matrix according to the next set of leaf node members;

merging similar cells of the matrix; and generating a new hierarchy from the matrix;

wherein the new hierarchy corresponds to a slid version of the report; and displaying the new hierarchy within the cells of the report such that the next set of leaf node members of the dimension that are children of the next parent, which is different from the original parent, are displayed in response to the selection indicating to scroll the dimension.

11. The computer-readable storage medium of claim 10, further comprising initiating the dimensional sliding of the report in response to a selection on a bar slider included in current view of the report, wherein the bar slider is one of a set of user interface options that are selectable for navigating the report along dimension members in a non-hierarchical pattern.

12. The computer-readable storage medium of claim 10, wherein the next set of leaf node members corresponds to the next sequential leaf node of the dimension being slid.

13. The computer-readable storage medium of claim 10, wherein the next set of leaf node members corresponds to the next sequential leaf node of the dimension being slid that has data associated with the leaf node.

14. A system for dimensionally sliding a report, the system comprising:

a computing device;

a multidimensional data structure;

a report engine;

a memory, the memory having stored thereon computer-executable instructions for execution by the report engine, the instructions comprising:

determining an original set of data that is included within a display of the report; wherein the displayed report comprises cells; wherein the data is associated with a dimension; wherein the original set of data includes an original instance of the dimension that includes an original set of leaf node members of an original parent node; and in response to a selection indicating to scroll the dimension to display a next instance of the dimension:

determining the next instance of the dimension, wherein the next instance includes a next set of leaf node members of a next parent, the next parent being different from the original parent node and wherein a hierarchical level associated with the next instance is independent of the hierarchical level associated with the original instance;

updating the data included in the cells of the report to correspond to the selection, wherein the updated data corresponds to data in the multidimensional structure that is non-hierarchically dimensionally relative to the original set of data and the updated data includes the next instance of the dimension, wherein the updating includes:

decomposing the updated data into a matrix;

computing the next set of leaf node members included in the matrix;

rebuilding the matrix according to the next set of leaf node members;

merging similar cells of the matrix; and generating a new hierarchy from the matrix; and displaying the updated data including the new hierarchy such that the next instance of the dimension that is a child of the next parent, which is different from the original parent, is displayed in response to the selection indicating to scroll the dimension.

15. The system of claim 14, wherein the original set of data and the updated set of data are dimensionally relative to one another according to the direction of a bar slider selected and the dimension member to which the bar slider is applied.

16. The system of claim 14, further comprising hiding rows and columns that contain no data applicable to the selection.

17. The system of claim 14, further comprising adding at least one of rows and columns in the report in response to the selection.

18. The system of claim 14, further comprising removing at least one of rows and columns in the report in response to the selection.

* * * * *